United States Patent

Bradshaw et al.

[11] Patent Number: 5,864,775
[45] Date of Patent: Jan. 26, 1999

[54] METHOD OF AND APPARATUS FOR CALIBRATING ROTARY POSITION TRANSDUCERS

[75] Inventors: Benjamin James Bradshaw, Dorridge; Anthony Claude Wakeman, Halesowen, both of England

[73] Assignee: Lucas Industries, public limited company, England

[21] Appl. No.: 765,561
[22] PCT Filed: Jun. 12, 1995
[86] PCT No.: PCT/GB95/01371
 § 371 Date: Dec. 20, 1996
 § 102(e) Date: Dec. 20, 1996
[87] PCT Pub. No.: WO96/01980
 PCT Pub. Date: Jan. 25, 1996

[30] Foreign Application Priority Data

Jul. 7, 1994 [GB] United Kingdom ............... 9413677

[51] Int. Cl.[6] .................................................. G01D 18/00
[52] U.S. Cl. ........................ 702/109; 702/97; 73/117.3
[58] Field of Search ................. 364/571.01–571.07, 364/431.08, 431.01–431.07, 565, 429.05; 73/116, 117.1–117.3, 768, 774; 123/436; 702/85–89, 94, 96, 97, 104

[56] References Cited

U.S. PATENT DOCUMENTS 5,117,681  6/1992  Dosdall et al. .......................... 73/116
5,170,365  12/1992  Collopy et al. ........................ 364/565
5,237,504  8/1993  Holmes et al. ..................... 364/431.18

FOREIGN PATENT DOCUMENTS 2198241  6/1995  United Kingdom ............. G01P 3/48

*Primary Examiner*—Kamini Shah
*Attorney, Agent, or Firm*—Andrus, Sceales, Starke & Sawall

[57] ABSTRACT

A rotary position transducer comprises a sensor cooperating with a toothed wheel which has nominally evenly spaced teeth and which may, for instance, be mounted on the crankshaft of an internal combustion engine. The times at which the teeth pass the sensor are stored. The time intervals between consecutive teeth are calculated, for instance during fuel cut-off operation of the engine. An error in the angular spacing between consecutive teeth is calculated for the time interval between consecutive teeth, a time interval between further teeth disposed symmetrically about the consecutive teeth, and the nominal angular spacing between the further teeth.

13 Claims, 4 Drawing Sheets

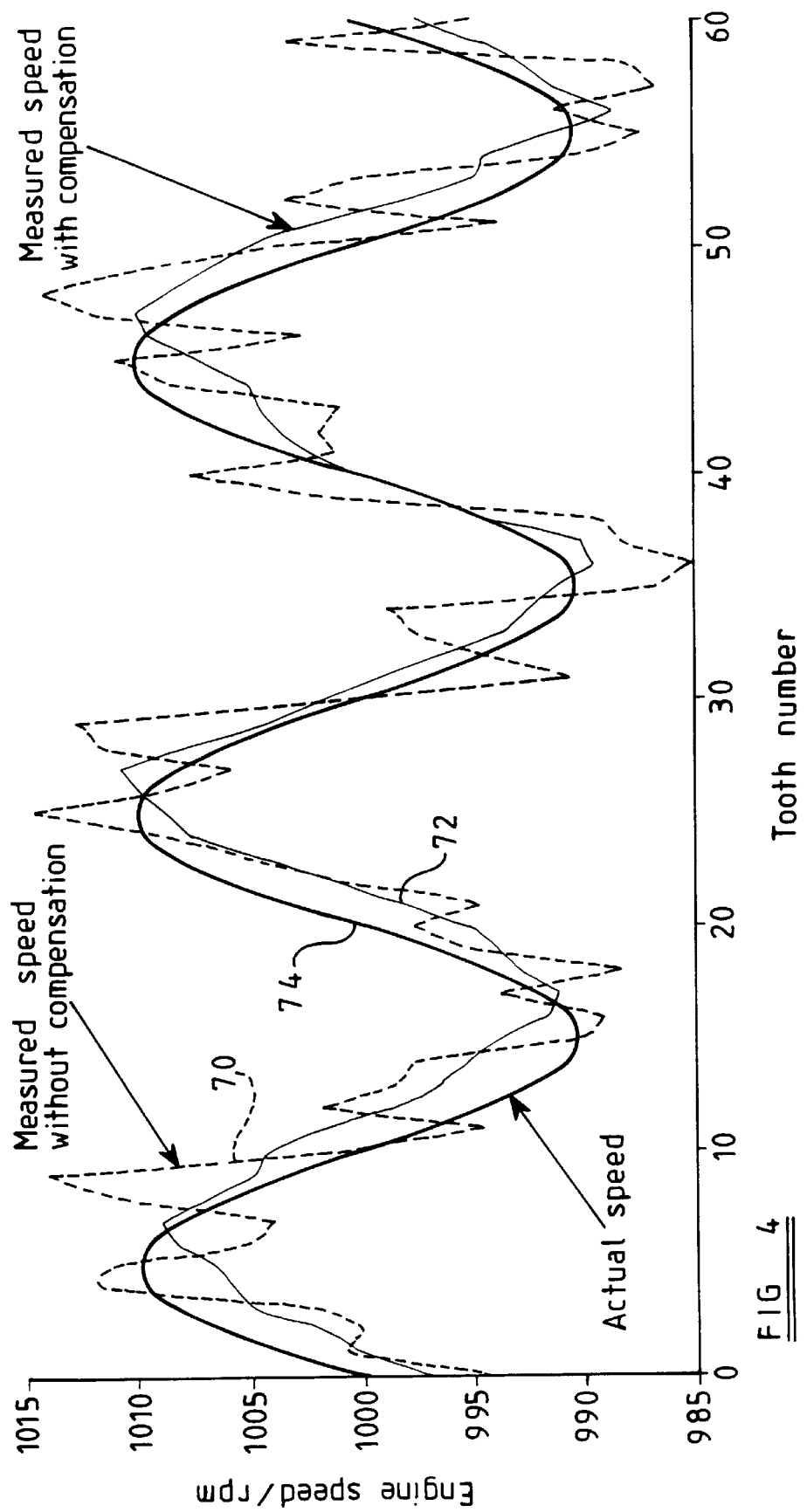

10

METHOD OF AND APPARATUS FOR CALIBRATING ROTARY POSITION TRANSDUCERS

The present invention relates to a method of and apparatus for calibrating rotary position transducers. Such a method and apparatus may be used within an internal combustion engine so as to compensate for systematic errors in measurements of the engine position.

U.S. Pat. No. 5,117,681 describes measuring the positions of teeth on a position sensor for an internal combustion engine by running the engine up to a high speed and then cutting the fuel to the engine. It is assumed that the engine will undergo smooth deceleration. The average velocity of the engine is measured over one or more complete revolutions. Further measurements of velocity are made between consecutive teeth and these measurements are compared with the average measurement. Discrepancies in the velocity measurements are attributed to non-uniformities in the positions of the teeth.

It has been found that even though the measurements are taken under fuel cut conditions, a cyclic variation in the engine speed is still present due to cylinder compressions and piston inertial effects. This causes inaccuracies when comparing intertooth velocities with averaged velocities measured over one or more cycles of the engine.

According to a first aspect of the present invention there is provided a method of calibrating an apparatus for measuring rotational movement, the apparatus comprising a plurality of markers arranged to move past a sensor in response to rotary motion of a first element whose position is to be measured, the method comprising measuring a first rotational speed of the first element between first and second positions separated by less than one revolution and corresponding to a first number of markers passing the sensor, measuring a second rotational speed of the first element between third and fourth positions corresponding to a second number of markers passing the sensor, the third and fourth positions lying between the first and second positions, and correcting an estimate of the distance between the third and fourth positions by comparing the first rotational speed measurement with the second rotational speed measurement.

It is thus possible to determine errors in the positioning of the markers and to use the estimation of the errors to correct subsequent measurements of rotary position and/or speed.

The first element may be a shaft of an internal combustion engine, such as a crankshaft or a cam shaft. Advantageously the first element carries a toothed wheel thereon, the wheel being arranged to rotate with the shaft and the teeth being arranged to pass a sensor.

Preferably the first and second positions are separated by no more than (720/N) degrees where N is the number of cylinders of the internal combustion engine. Advantageously the third and fourth positions are one intertooth separation apart.

Preferably the third and fourth positions are substantially symmetrically disposed about a midpoint between the first and second positions. Advantageously the speed of the engine is monitored so as to ensure that measurements are only taken during periods when the rate of change of acceleration is less than a predetermined threshold.

Advantageously the times, during a single revolution or rotation slightly in excess of a single revolution, at which each one of the teeth passes the sensor are recorded. The measurements of the time may be analysed in conjunction with engine position data so as to determine the relative position of each tooth with respect to a reference tooth and/or the position of each tooth with respect to its neighbours.

Preferably the engine position data is provided by counting the passage of the teeth past the sensor.

According to a second aspect of the present invention there is provided an apparatus for calibrating an apparatus for measuring rotational movement, the apparatus for measuring rotational movement comprising a plurality of markers arranged to move past a sensor in response to rotary motion of a first element whose position is to be measured, the apparatus for calibrating position errors comprising speed measuring means for measuring a first rotational speed of the first element between first and second positions separated by less than one revolution and corresponding to a first number of markers passing the sensor, and for measuring a second rotational speed of the first element between third and fourth positions corresponding to a second number of markers passing the sensor, the third and fourth positions lying between the first and second positions, and correcting means for correcting an estimate of the distance between the third and fourth positions by comparing the first rotational speed measurement with the second rotational speed measurement.

According to a third aspect of the present invention there is provided a rotary position measurement apparatus comprising an apparatus according to the second aspect of the present invention.

Preferably the first element carries a toothed wheel having nominally uniformly spaced teeth.

Preferably the measurements of speed are made by comparing the times at which teeth pass the sensor and assuming that the amount of rotation can be accurately determined since the teeth are substantially uniformly spaced at a predetermined angular separation.

It is thus possible to estimate and account for positioning errors in the positions of each one of the teeth of the toothed wheel. The error data may be used to correct speed measurement data so as to increase the accuracy of measurements of speed of the first element.

The present invention will further be described, by way of example, with reference to the accompanying drawings, in which:

FIG. 4 shows a comparison of speed measured using a toothed wheel both with and without applying a correction for errors in the positioning of the teeth together with an indication of the actual speed.

Figure 1:
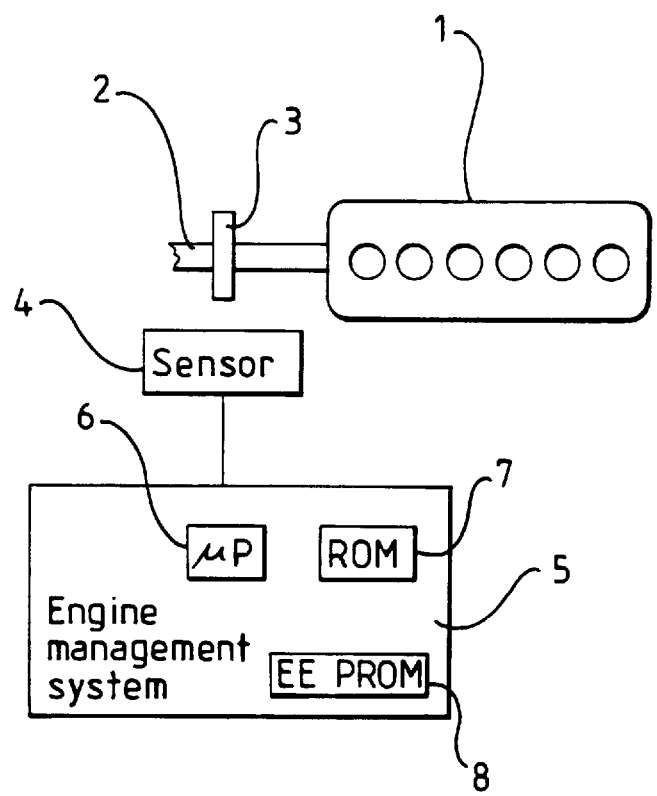
FIG. 1 is a schematic diagram of an internal combustion engine having an engine management system incorporating an apparatus constituting an embodiment of the present invention.

The engine 1 shown in FIG. 1 has a crankshaft 2 carrying a toothed wheel 3. A sensor 4 is located adjacent the toothed wheel 3 and is arranged to provide an output signal indicating the passage of each tooth. An output of the sensor 4 is provided to an engine management system 5. The engine management system 5 is embodied by a programmable data processor 6 which performs instructions stored in a read only memory (ROM) 7 and is arranged to store data, such as corrected positions of the teeth, into a non-volatile memory, such as an electrically erasable programmable read only memory (EEPROM) 8.

The toothed wheel 3 has sixty regularly spaced teeth formed around the circumference thereof. Thus, each tooth is nominally spaced at six degree intervals. Manufacturing tolerances give rise to position errors of approximately plus or minus 0.1 degrees relative to an arbitrary reference tooth. Thus, for the case in which speed measurements are made over an angular interval of 12 degrees, they are subject to a maximum error of approximately 1.6%. The tooth position errors are systematic errors. The engine management system 5 is arranged to analyse the distribution of teeth around the toothed wheel 3 so as to compensate for tooth position errors.

Figure 2:
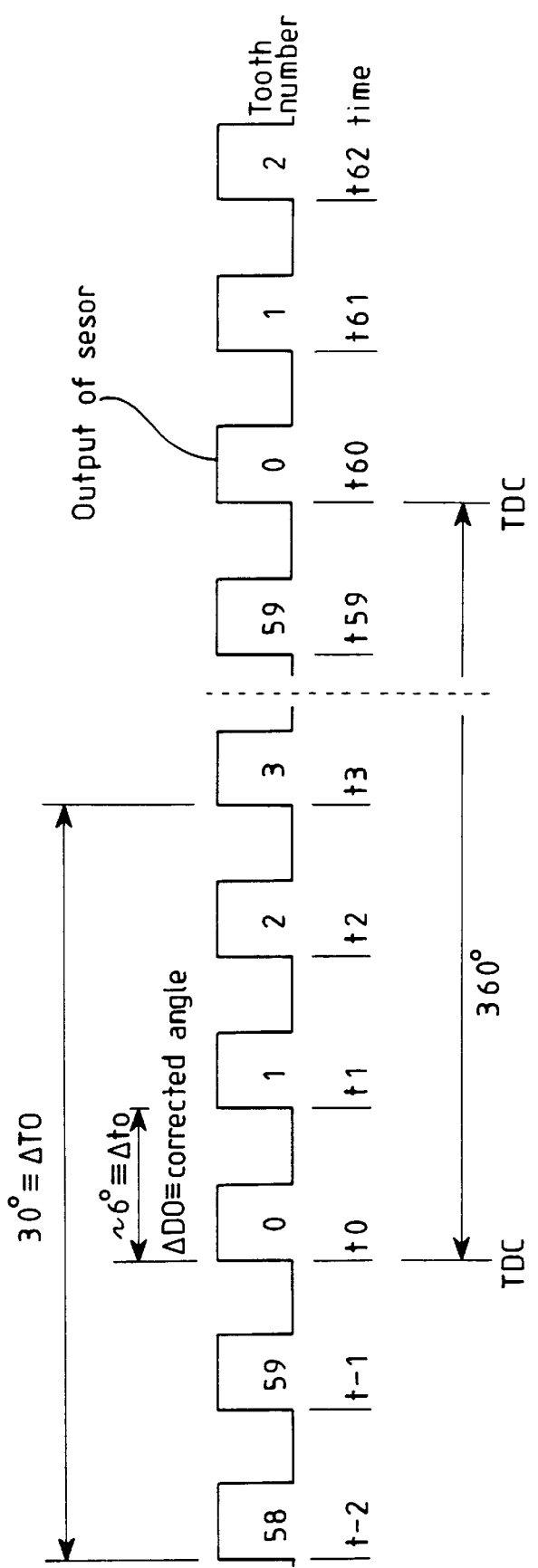
FIG. 2 is a timing diagram illustrating operation of an embodiment of the present invention.

FIG. 2 shows an idealised output signal from the sensor 4. Tooth zero is taken as the reference tooth and corresponds to the top dead centre (TDC) position of a predetermined cylinder. The microprocessor is arranged to record the time at which the leading edge of each tooth passes the sensor 4. Starting with the reference tooth at time t0, the time at which the leading edge of the first tooth passes the sensor 4 is recorded at t1, the time at which leading edge of the second tooth passes the sensor 4 is recorded at t2, and so on.

An exemplary calculation of the intertooth error between tooth zero and tooth 1 will now be described with reference to FIG. 2. The series of time measurements t-2 to t62 taken over slightly more than one revolution of the crankshaft is analysed so as to determine the time that elapsed between the passage of the leading edges of the zeroth and first teeth. This time, corresponding to t0-t0, is stored in a first value $\Delta t0$. A second value $\Delta T0$ corresponding to the average speed of the engine during a period substantially symmetrically disposed about the period t1-t0 is calculated for the 30 degrees of engine rotation between t-2 and t3. The tooth position error for tooth zero can then be calculated from:

Tooth error (N)=(30×($\Delta t0/\Delta T0$))−6

Thus, for example, if t1-t0 is equal to 1,006.4 microseconds, and t3-(t-2) is equal to 4,995.2 microseconds, then the intertooth distance between teeth 0 and 1 is in error by +0.0442 degrees.

Figure 3:
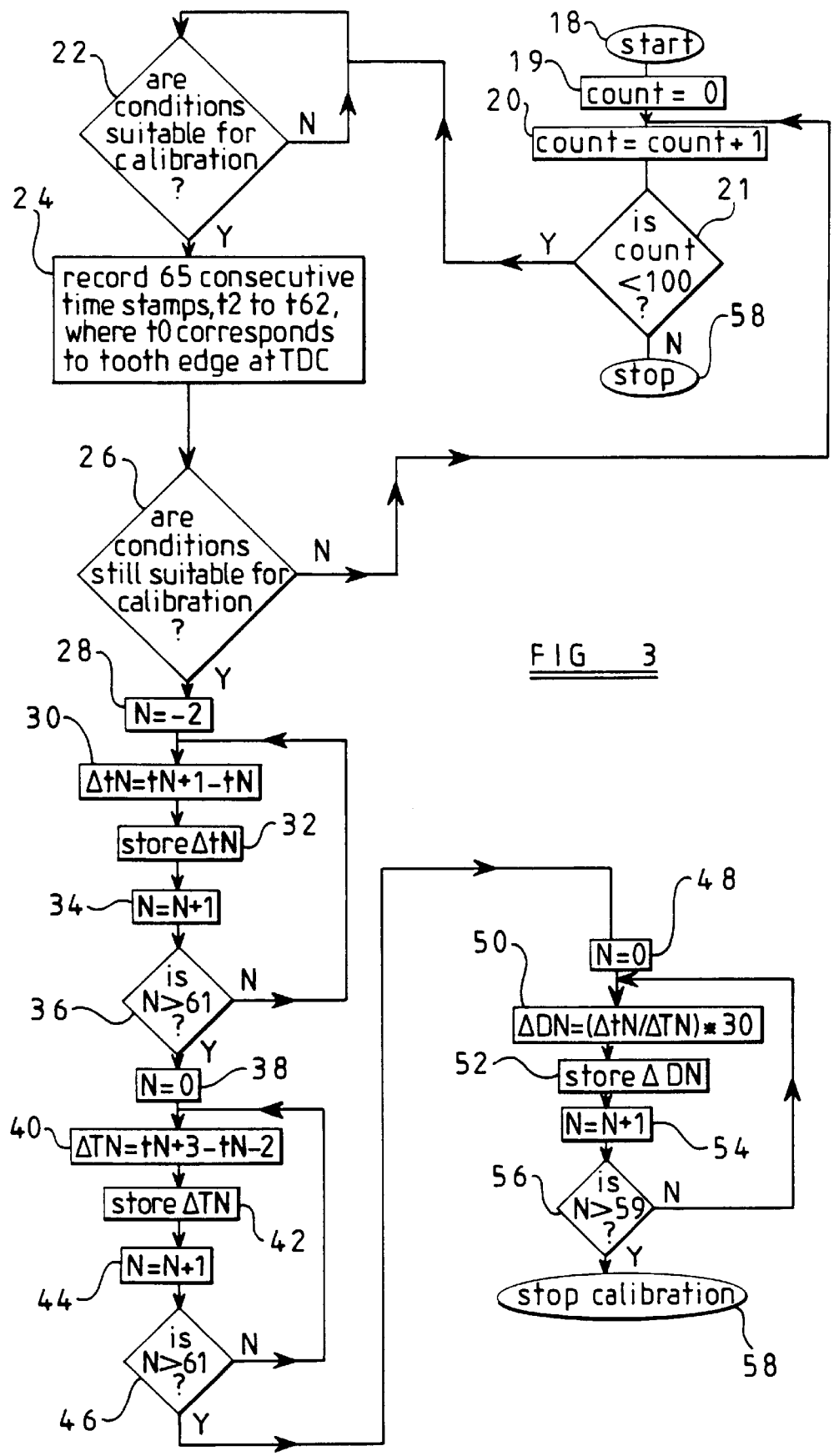
FIG. 3 is a flow chart illustrating the steps taken by the microprocessor shown in FIG. 1.

FIG. 3 shows a flow chart for a calibration procedure indicating how the positional error for each tooth of the toothed wheel 3 can be determined. The flow chart commences at step 18. Control is passed to step 19 where a variable COUNT is initialised by being set to zero. The value of COUNT is incremented at step 20. The value of count is tested at step 21. If count is less than 100, control is passed to step 22, otherwise control is passed to step 58 which terminates the procedure. A decision is taken at step 22 as to whether the operating conditions are suitable to perform a measurement of the teeth positions. Suitable conditions may be that the engine speed, and/or load/driver demand are within predetermined values and that the rate of engine acceleration or deceleration is substantially uniform, and ideally zero. The flow chart illustrates the calculations to be undertaken when the engine is running at substantially uniform speed. However, the steps may be modified to account for uniform acceleration and deceleration, in which case the calculation should be performed in terms of revolutions per minute instead of time. If the conditions are unsuitable, control is returned to the start of the step 22. If conditions are suitable, control is passed to step 24 where the times of passage of 65 consecutive teeth are recorded in variables t-2 to t62. The variable t0 corresponds to the tooth edge passing the sensor 4 at TDC. Control is then passed to step 26 where a check on the engine operating conditions is again performed. If the conditions are unsuitable, control is passed to step 20, whereas if the conditions are suitable control is passed to step 28. Should suitable conditions not be obtained in 100 attempts (as indicated by the value of COUNT), then the calibration is aborted. The procedure may be reentered at a later time, for instance the next time the engine is started.

Steps 28 to 36 calculate the intertooth time period between consecutive teeth. A variable N is set to −2 at step 28. Step 30 calculates the intertooth period $\Delta tN$ between the Nth and the (N+1)th teeth. The value of $\Delta tN$ is stored at step 32, the value of N is incremented at step 34 and step 36 checks to see whether the value of N is greater than 61. Control is returned from step 36 to step 30 if the value of N is less than or equal to 61, whereas control is passed to step 38 if the value of N is greater than 61.

Steps 38 to 46 calculate the time taken for the engine to undergo 30 degrees of revolution substantially centred about the Nth and (N+1)th teeth. The value of N is reset to zero at step 38. Step 40 calculates a period $\Delta TN$ for the 30 degrees of revolution occurring between the times at which the T(N+3)th and the T(N−2)th teeth pass the sensor 4. The value $\Delta TN$ is stored at step 42, the value of N is incremented at step 44, and step 46 tests the value of N to see whether it exceeds 61. If the value of N is less than or equal to 61, control is returned to step 40; otherwise control is passed to step 48.

Steps 48 to 56 calculate the separation between consecutive teeth. The variable N is reset to zero at step 48. The intertooth separation $\Delta DN$ between the Nth and the (N+1)th teeth is calculated at step 50 by multiplying the quotient of $\Delta tN$ divided by $\Delta TN$ by 30. The value of $\Delta DN$ is stored at step 52, the value of N is incremented at step 54, and step 56 examines the value of N to see if it exceeds 59. If N is less than or equal to 59, control is passed to step 50. Otherwise control is passed to step 58 where the procedure is terminated.

The measured intertooth separations are stored in the memory 8 and are used in engine speed calculations performed by the engine management system 5.

Although the position error of each tooth is relatively small, significant improvements in measurement of engine speed can be obtained by making a correction for changes in the intertooth separation between adjacent teeth. FIG. 4 shows experimental data in which the broken line 70 shows estimates of the speed based on the assumption that each tooth of the toothed wheel 3 was separated from its neighbours by exactly 6 degrees, line 72 indicates speed data calculated using corrected intertooth separations as calculated by an embodiment of the present invention, and line 74 indicates the actual speed upon which the other data is based. It is noted that the measurements of speed are much improved. The calibration routine, as indicated in FIG. 3, need only be performed infrequently and at times such that the cyclic variation of engine speed is small compared to the mean engine speed.

It is thus possible to enhance the accuracy of speed measurements taken using a toothed wheel or a similar rotating element carrying a plurality of markers.

We claim:

1. A rotary position calibration method for calibrating an apparatus for measuring rotational movement, the apparatus comprising a plurality of marks arranged to move past a sensor in response to rotary motion of an element whose position is to be measured, the method comprising measuring a first rotational speed of the element between first and second positions separated by less than one revolution and corresponding to a first number of markers passing the sensor, measuring a second rotational speed of the element between third and fourth positions corresponding to a second number of markers passing the sensor, the third and fourth positions being between the first and second positions, and calibrating the apparatus by correcting an estimate of the distance between the third and fourth positions by comparing the first rotational speed measurement with the second rotational speed measurement.

2. A method as claimed in claim 1, in which the markers comprise teeth of a toothed wheel mounted on the element.

3. A method as claimed in claim 1, in which the element comprises a rotating part of an internal combustion engine.

4. A method as claimed in claim 3, in which the first and second positions are separated by no more than 720/N degrees, where N is the number of cylinders of the internal combustion engine.

5. A method as claimed in claim 3, in which the speed of the engine is monitored and the first and second rotational speeds are measured when the rate of change of acceleration of the engine is less than a predetermined threshold.

6. A method as claimed in claim 3, in which engine position data are provided by counting the passage of the markers past the sensor.

7. A method as claimed in claim 1, in which the third and fourth positions are spaced apart by one intermarker separation.

8. A method as claimed in claim 1, in which the third and fourth positions are substantially symmetrically disposed about the midpoint between the first and second positions.

9. A method as claimed in claim 8, in which the corrected angular distance between the third and fourth positions is calculated as $(\alpha \cdot \Delta t0)/\Delta T0$, where $\alpha$ is the angular distance between the first and second positions, $\Delta T0$ is the time interval between passage of first and second markers at the first and second positions past the sensor, and $\Delta t0$ is the time interval between passage of third and fourth markers at the third and fourth positions past the sensor.

10. A method as claimed in claim 1, in which the time at which each of the markers passes the sensor is recorded during a single revolution or during rotation slightly in excess of a single revolution of the element.

11. A rotary position calibration apparatus for calibrating an apparatus for measuring rotational movement, the apparatus for measuring rotational movement comprising a plurality of markers arranged to move past a sensor in response to rotary motion of an element whose position is to be measured, the calibrating apparatus comprising: speed measuring means for measuring a first rotational speed of the element between first and second positions separated by less than one revolution and corresponding to a first number of markers passing the sensor, and for measuring a second rotational speed of the element between third and fourth positions corresponding to a second number of markers passing the sensor, the third and fourth positions lying between the first and second positions; and calibration means including correcting means for correcting an estimate of the distance between the third and fourth positions by comparing the first rotational speed with the second rotational speed.

12. A rotary position calibration method for calibrating an apparatus for measuring rotational movement and determining a position or an error in a position of a first of a plurality of nominally equi-angularly spaced markers on a rotating element, comprising: measuring a first time interval between passages of the first marker and a second of the markers separated by less than one revolution past a reference point; measuring a second time interval between passages of third and fourth of the markers past the reference point, the third and fourth markers being disposed between the first and second markers; and calibrating the apparatus by calculating the position error from the first and second time intervals and the nominal angular spacings between the first and second markers and the third and fourth markers.

13. A method of calibrating an apparatus for measuring rotational movement, the apparatus comprising a plurality of markers arranged to move past a sensor in response to rotary motion of an element whose position is to be measured, the method comprising measuring a first rotational speed of the element between first and second positions separated by less than one revolution and corresponding to a first number of markers passing the sensor, measuring a second rotational speed of the element between third and fourth positions corresponding to a second number of markers passing the sensor, the third and fourth positions being between the first and second positoins, and correcting an estimate of the distance between the third and fourth positions by comparing the first rotational speed measurement with the second rotational speed measurement, wherein the third and fourth positions are substantially symmetrically disposed about the midpoint between the first and second positions, and wherein the corrected angular distance between the third and fourth positions is calculated as $(\alpha \cdot \Delta tO)/\Delta TO$, where $\alpha$ is the angular distance between the first and second positions, $\Delta TO$ is the time interval between passage of first and second markers at the first and second positions past the sensor, and $\Delta tO$ is the time interval between passage of third and fourth markers at the third and fourth positions past the sensor.

* * * * *